United States Patent
Errington et al.

(10) Patent No.: US 7,156,167 B2
(45) Date of Patent: Jan. 2, 2007

(54) HEATING, VENTILATION AND AIR CONDITIONING SYSTEM AND METHOD

(75) Inventors: Bradley C. Errington, Bellefontaine, OH (US); Junichi Kanemaru, Upper Arlington, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 237 days.

(21) Appl. No.: 10/436,957

(22) Filed: May 13, 2003

(65) Prior Publication Data

US 2004/0244960 A1    Dec. 9, 2004

(51) Int. Cl.
*B60H 1/00* (2006.01)

(52) U.S. Cl. .................. 165/203; 165/42; 165/43; 165/288; 165/289; 62/244; 236/1 B; 236/49.3

(58) Field of Classification Search ........... 165/202, 165/203, 42, 43, 201, 288, 289; 236/1 B, 236/49.3; 62/244
See application file for complete search history.

(56) References Cited

U.S. PATENT DOCUMENTS 4,617,986 A * 10/1986 Kobayashi et al. ........... 165/42
6,304,803 B1 * 10/2001 Dao ........................... 165/203
6,758,265 B1 * 7/2004 Henry et al. ................. 165/203
6,793,016 B1 * 9/2004 Aoki et al. .................. 165/202

* cited by examiner

Primary Examiner—John K. Ford
(74) Attorney, Agent, or Firm—Rankin, Hill, Porter & Clark LLP; Mark E. Duell

(57) ABSTRACT

A vehicle HVAC control system including front and rear HVAC control systems for controlling a front HVAC system and a rear HVAC system, and a method for controlling the front and rear HVAC systems. A front set point temperature is used by the front HVAC control system to control operation of the front HVAC system. The front set point temperature is communicated to the rear HVAC control system. The rear HVAC control system derives a rear set point temperature, which is based upon the front set point temperature and a temperature adjustment value, to control operation of the rear HVAC system. The temperature adjustment value is one of a plurality of predetermined temperature adjustment values that may be selected by a rear seat passenger to adjust the rear set point temperature relative to the front set point temperature and thereby permit the rear set passengers to control the temperature of air delivered to the rear seat.

16 Claims, 2 Drawing Sheets

HEATING, VENTILATION AND AIR CONDITIONING SYSTEM AND METHOD

BACKGROUND OF THE INVENTION

1. Field of the Invention

The present invention is generally directed toward a heating, ventilation, and air conditioning system and method and, more specifically, toward an HVAC system and method for use in a vehicle.

2. Description of Related Art

A conventional vehicle includes a heating, ventilation, and air conditioning system (hereinafter HVAC system) for adjusting the temperature in a passenger compartment of the vehicle. In vehicles having a relatively large passenger compartment, it is common to provide a front HVAC system for front passengers and a rear HVAC system for rear passengers. In its most basic form, the front and rear HVAC systems are completely separate or independent of one another. In more advanced systems, the front and rear HVAC systems are in communication with one another to permit front passengers to control, to some extent, the rear HVAC system.

U.S. Pat. No. 6,304,803, the disclosure of which is expressly incorporated herein in its entirety, is representative of the state of the art. In the '803 patent, the rear HVAC system may be either controlled by the front HVAC control system or manually by the rear passengers. When rear manual control is enabled, the rear passengers are permitted to control operation of the rear HVAC system via the rear control panel. If rear manual control is disabled, the rear HVAC system is controlled by the front HVAC control system, which may be either automatic or manual control.

However, it has been found that limited rear manual control may be more desirable. This is especially true of the temperature settings of the rear HVAC system. Therefore, there exists a need in the art for a method and system wherein rear manual control is based upon the front HVAC control settings, and wherein a temperature set point of the rear HVAC system is based upon the temperature set point of the front HVAC system.

SUMMARY OF THE INVENTION

The present invention is directed toward a vehicle HVAC system and method wherein a temperature set point of a rear HVAC system is based upon, and derived from, a temperature set point of a front HVAC system. The present invention is further directed toward a rear HVAC system wherein control appears to be manual, but in fact is primarily automatically controlled based upon the front HVAC system.

In accordance with the method of the present invention, a front set point temperature is manually input into the front HVAC system, and the front HVAC system is controlled or operated by a front HVAC control system in response to the front set point temperature. The front HVAC control system communicates control information, including the front set point temperature, to a rear HVAC control system of the rear HVAC system. A rear set point temperature is based upon the front set point temperature. The rear HVAC system is controlled or operated by the rear HVAC control system in response to the rear set point temperature and in accordance with the control information supplied by the front HVAC control system.

In accordance with the system of the present invention, a front HVAC control system includes a control panel to permit front passengers to input control information to the front HVAC control system, and a rear HVAC control system includes a rear control panel to permit rear passengers to input control information to the rear HVAC control system. The front HVAC system includes a switch to selectively permit rear-seat passengers to have limited rear manual adjustment of the rear set point temperature. The rear control panel includes a temperature adjustment dial whereby the rear set point temperature may be incrementally adjusted relative to the front set point temperature. The front HVAC control system communicates with the rear HVAC control system and provides control information, including the front set point temperature, to the rear HVAC control system. When rear manual control is enabled, the rear HVAC control system determines a rear set point temperature based upon the front set point temperature and a temperature adjustment value input via the rear control panel. The rear set point temperature is used, together with control information from the front HVAC control system, to automatically control operation of the rear HVAC system. When rear manual control is disabled, the rear set point temperature is equal to the front set point temperature. Accordingly, operation of the rear HVAC control system to control the rear HVAC system is based upon the control information provided by the front HVAC control system, as modified, if at all, by user manipulation of the temperature adjustment dial on the rear control panel.

BRIEF DESCRIPTION OF THE DRAWINGS

These and further features of the present invention will be apparent with reference to the following description and drawings, wherein.

DETAILED DESCRIPTION OF THE PREFERRED EMBODIMENTS

Figure 1:
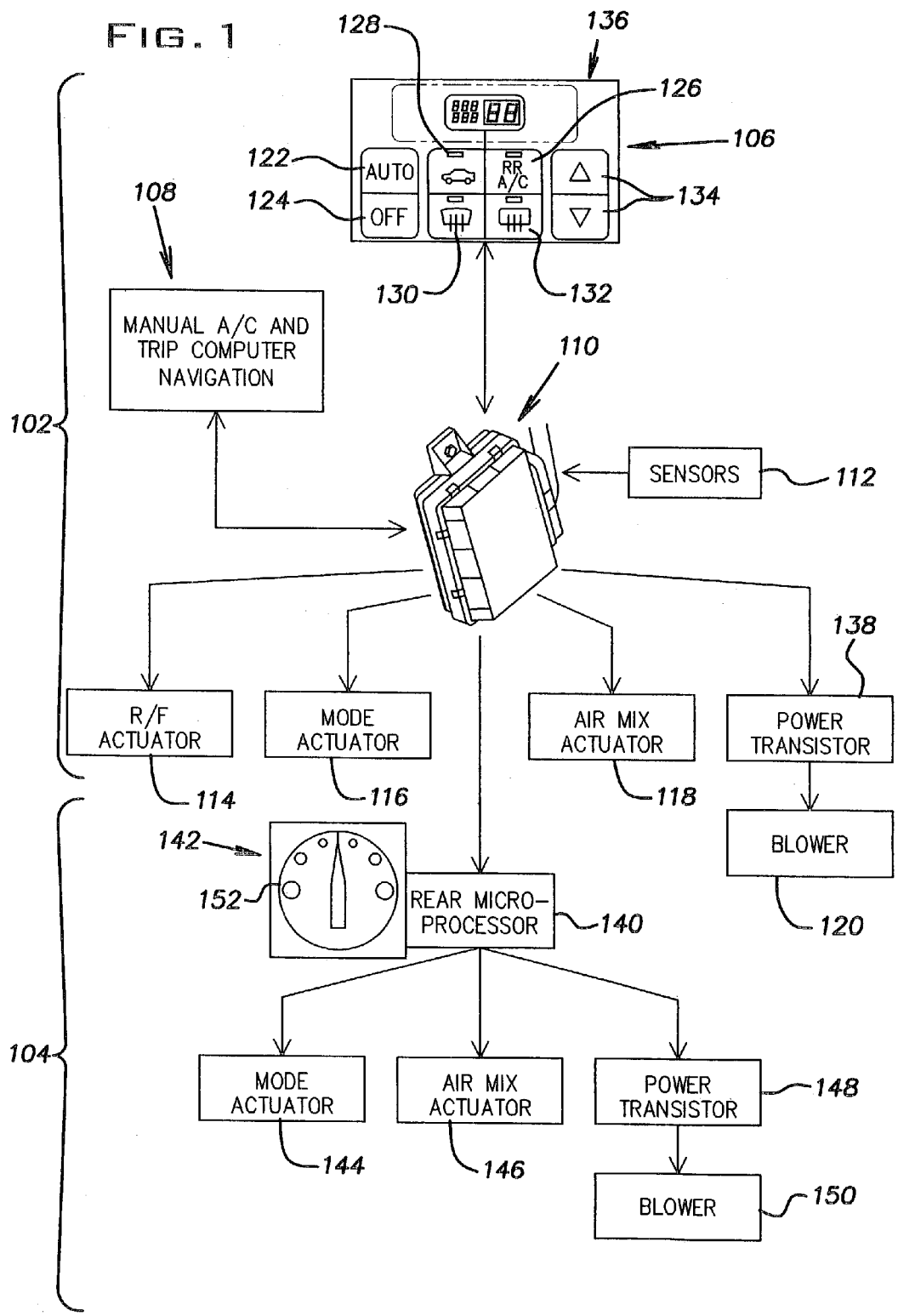
FIG. 1 is a schematic diagram of a vehicle HVAC control system in accordance with the present invention; and, FIG. 2 is a flowchart of a method in accordance with the present invention.

With reference to FIG. 1, an automobile HVAC control system according to the present invention is schematically illustrated. The HVAC control system includes a front HVAC control system 102 and a rear HVAC control system 104. The front HVAC control system 102 controls a front HVAC system, and has controls and vents disposed in or around the front dashboard. The rear HVAC control system 104 controls a rear HVAC system, and has a temperature adjustment dial 152 mounted in a position accessible to rear passengers and a plurality of vents for the rear passengers (and, optionally, further vents for third-row passengers).

The front HVAC system includes a compressor, a heater core, an evaporator, actuators, sensors, and a blower fan. The rear HVAC system includes a heater core, an evaporator, actuators, and a blower fan. In accordance with the present invention, the rear HVAC system preferably does not include its own temperature sensor. The front and rear heater cores are preferably on the same fluid circuit. The compressor preferably supplies refrigerant to both the front and rear evaporators. It is considered apparent that several interchangeable automobile HVAC systems are well known in the art. Insofar as the present invention is directed toward systems and methods for controlling operation of such conventional HVAC systems, application of the present invention is not limited to any particular HVAC system, and specific HVAC system structures will not be further discussed hereinafter.

With continued reference to FIG. 1, the front HVAC control system 102 includes a front control panel 106, a manual air conditioning and trip computer/navigation control panel 108, a microprocessor 110, sensors 112, a power transistor 138, a recirculation/fresh air (R/F) actuator 114, a mode actuator 116, an air mix actuator 118, and a blower 120.

The front control panel 106 includes an automatic control setting button 122, an off button 124, a rear manual button 126, a recirculation/fresh air (R/F) button 128, a front defrost button 130, a rear defrost button 132, and buttons 134 for incrementally increasing/decreasing a front set point temperature. The front control panel 106 also includes a display 136 for showing operating conditions, such as the front set point temperature and the operational setting (manual/automatic).

The manual air conditioning and trip computer/navigation control panel 108 preferably includes a touch screen or push buttons (not shown) for controlling fan speed, mode control (vent selection), compressor activation (A/C on/off) and a display for showing operating conditions of the automobile, such as ambient temperature, active vents, blower speed, miles per gallon, distance traveled, elapsed trip time, etc.

The sensors 112 detect environmental and operating conditions, and preferably include at least one radiation sensor for detecting the level of solar radiation or load, a sensor for detecting interior temperature at the front passenger compartment, a sensor for detecting exterior temperature, a sensor for detecting evaporator temperature, and a sensor for detecting water temperature. Naturally, other sensors for detecting additional conditions of interest, such as oil pressure, engine temperature, fuel level, and humidity, may also be provided.

Two-way communication is provided between the front microprocessor 110 and the front control panel 106 and the manual air conditioning and trip computer/navigation control panel 108, as illustrated by the double headed arrows in FIG. 1. The front microprocessor 110 controls operation of the front HVAC system in response to detected operating conditions and user inputs. The front microprocessor 110 has a stored algorithm or software program for controlling the front HVAC system, when in the automatic control setting, in response to sensed conditions so as to have the detected temperature track or match a desired, user-input front temperature set point. The software program is preferably tuned to the physical characteristics (i.e., cabin size, glass area, insulation) of the subject automobile to optimize control and response time of the front HVAC system based upon sensed environmental conditions (i.e., interior/exterior temperature, ambient solar radiation, evaporator temperature, water temperature, etc.), and user input (desired front set point temperature). Since software programs for automatically controlling automobile HVAC systems are known in the art, and the present invention is not limited to any specific control algorithm, such programs will not be discussed further hereinafter.

The front microprocessor 110 controls the various actuators 114, 116, 118 in accordance with the user inputs, sensed conditions, control setting (manual/automatic), and mode of operation. The front microprocessor 110 also controls a power transistor 138 so as to have the front blower 120 operate at a user-selected speed when in the manual control setting, or to operate at a speed determined by the software program when in the automatic control setting. Preferably, the blower speed is infinitely adjustable.

The front microprocessor 110 also communicates with the rear HVAC control system 104 and, more specifically, with a rear microprocessor 140 provided by the rear HVAC control system 104. As will be described more fully hereinafter, the front microprocessor 110 provides the control information to the rear microprocessor 140 regardless of the condition of the rear manual switch 126 (i.e., whether rear manual control is enabled/disabled) and the control setting (manual/automatic) of the front HVAC control system 102. In the preferred embodiment of the present invention, the control information provided to the rear HVAC control system 104 by the front HVAC control system 102 includes the front set point temperature, mode of operation, blower speed, sensed front temperature, etc.

The rear microprocessor 140 has a stored algorithm or software program for controlling the rear HVAC system based upon the control information provided from the front HVAC control system and the rear set point temperature. The software program is preferably tuned to the physical characteristics (i.e., cabin size, glass area, insulation) of the rear passenger compartment to optimize control and response time of the rear HVAC system. As noted previously, since software programs for automatically controlling automobile HVAC systems are known in the art, and the present invention is not limited to any specific control algorithm, such programs will not be discussed further hereinafter.

The rear HVAC control system 104 includes, in addition to the rear microprocessor 140, a rear control panel 142, a mode actuator 144, an air mix actuator 146, a power transistor 148, and a blower 150, which is driven by the power transistor 148. The rear control panel 142 includes the temperature adjustment dial 152.

The temperature adjustment dial 152 permits the rear passengers to adjust the rear set point temperature relative to the front set point temperature, which has been supplied to the rear microprocessor 140 from the front microprocessor 110. Preferably, the temperature adjustment dial 152 may be adjusted from a neutral position, wherein the rear HVAC system is off, to one of a plurality of temperature increments above or below the front set point temperature. In accordance with the preferred embodiment, the increments are +2, +4, +10° F. (when turned to the left in the drawing) and −2, −4, and −10° F. (when turned to the right in the drawing). Naturally, further or different temperature increments may be used instead of, or in addition to, the preferred temperature increments specified herein without departing from the scope and spirit of the present invention.

More specifically, the rear microprocessor 140 receives the front set point temperature from the front microprocessor 110, and receives the rear temperature adjustment value input via the temperature adjustment dial 152, and adjusts the rear set point temperature accordingly. Therefore, the rear set point temperature, while based upon the front set point temperature, may be modified relative to the front set point temperature by the rear passenger's manipulation of the rear temperature adjustment dial 152. The rear microprocessor 140 uses the rear set point temperature to control operation of the rear HVAC system in accordance with a control algorithm or software program resident in the rear microprocessor 140, as will be apparent from the following discussion.

Preferably, the rear control panel 142 is backlit only when control over the rear set point temperature is available to the rear passengers. Further, the illumination level of the backlighting of the rear control panel 142 is controlled such that, when the headlight switch is turned on (i.e., night time), the backlighting is at a lower illumination level than when the headlight switch is turned off (day time).

The mode actuator 144 is controlled by the rear microprocessor 140, and is operable to control a damper (not shown) that directs output air flow to the desired vents. In the illustrated embodiment either lower, floor vents or upper, face vents may be selected. The rear microprocessor 140 actuates the mode actuator in accordance with a mode of operation provided by the front microprocessor 110.

The power transistor 148 is controlled by the rear microprocessor 140 so as to adjust an operating speed of the rear blower 150.

The air mix actuator 146 is also controlled by the rear microprocessor 140 so as to adjust a damper (not shown) that directs air from the blower and evaporator through the rear HVAC system heater core before exiting to the passenger compartment via the vents selected using the mode selector switch 154. The air mix is adjusted by the rear microprocessor 140 by operation of the algorithm or software program resident in the rear microprocessor and in response to the rear set point temperature and the control information provided from the front microprocessor 110. Since the front and rear evaporators are preferably on the same fluid circuit, whether rear HVAC system air conditioning is available is controlled by the front HVAC control system and, more specifically, by the compressor activation of the manual air conditioning and trip computer/navigation control panel 108.

As will be discussed more fully hereinafter with reference to the method of operating the HVAC control system according to the present invention, the rear microprocessor 140 transmits control information to the mode actuator 144, the air mix actuator 146, and the power transistor 148 to control the operation of the rear HVAC system. The rear microprocessor control information is based upon the control information provided by the front microprocessor 110 and the rear set point temperature, as implemented by the rear microprocessor software program. More specifically, if rear manual control is not enabled, the rear set point temperature is equal to the front set point temperature. If rear manual control is enabled, the rear set point temperature may be different than the front set point temperature (i.e., the front set point temperature as modified via manipulation of the temperature adjustment dial 152).

Control information, which is transmitted from the front microprocessor 110 to the rear microprocessor 140, as modified or updated in accordance with the rear temperature set point, is used by the rear microprocessor to control operation of the mode actuator 144, air mix actuator 146 and the power transistor 148. Accordingly, the rear microprocessor 140 receives the control information from the front microprocessor as well as the temperature set point adjustment information input via the temperature adjustment dial 152, and implements a predetermined secondary control algorithm to control the rear HVAC system. The blower speed and mode of operation of the rear HVAC system are automatically controlled by the rear microprocessor 140 based upon the control information provided from the front microprocessor 110 and the rear set point temperature.

Figure 2:
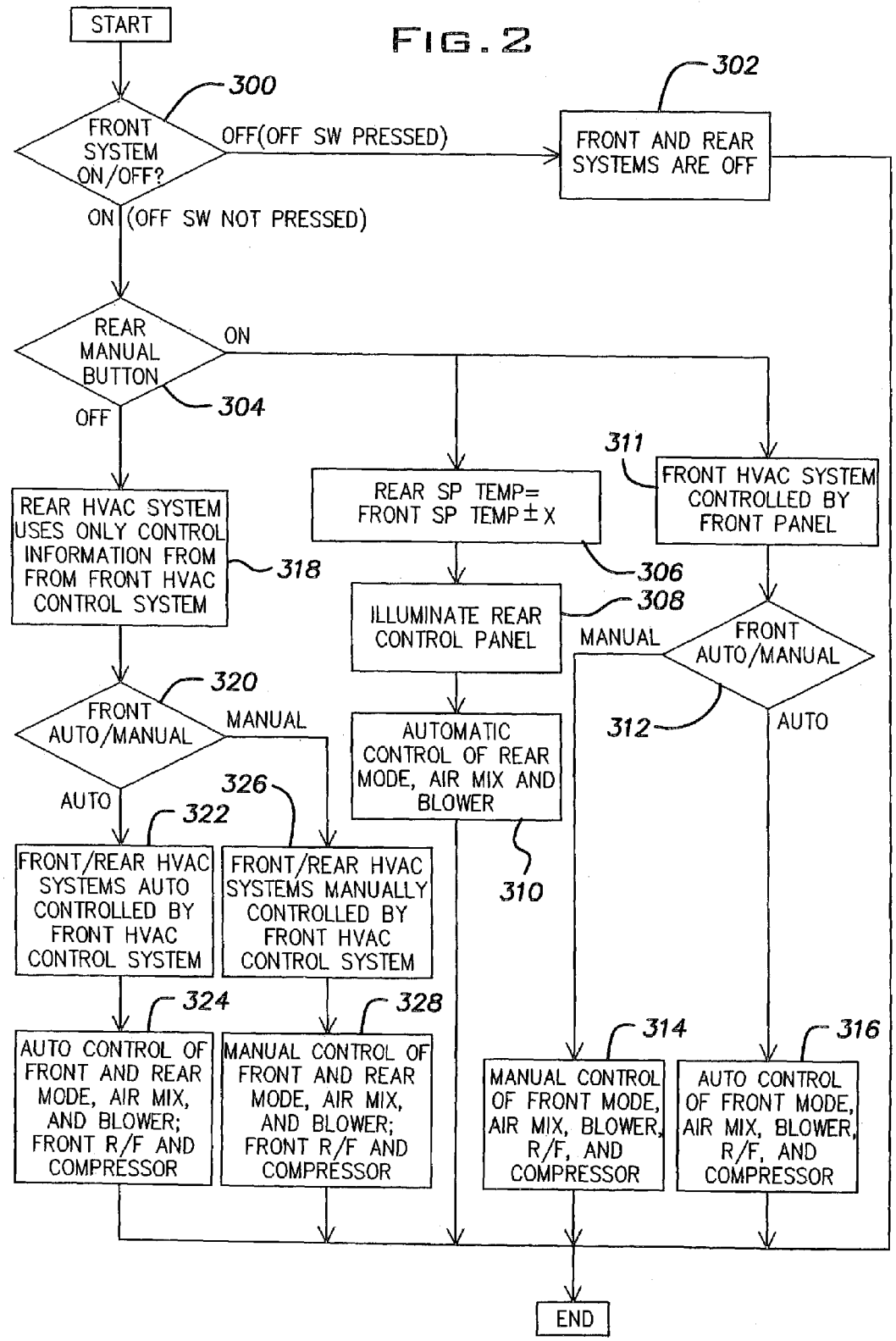

With reference to FIG. 2, a method for operating the automobile HVAC control system according to the present invention is illustrated. Although the flow chart of FIG. 2 includes a "start" and an "end", it is considered apparent that the drawing is intended to indicate a single pass through the control method according to the present invention. Naturally, the user input devices are continuously monitored for a change in the condition of the switch inputs (auto, off, r/f, def, mode, fan, A/C, temperature adjustment dial, etc.).

Initially, in step 300 the condition of the front system off button 124 on the front control panel 106 is determined. If the off button 124 is in the off position, the front and rear HVAC control systems are turned off (step 302). If the condition of any of the various front HVAC control panel inputs changes, the off button 124 is preferably turned to the on position.

If the off button is not depressed (i.e., the front HVAC system is on) then, keeping in mind that the rear manual button 126 is preferably reset to the off condition each time the vehicle is started, the condition of the rear manual button 126 is determined (step 304). If the rear manual button 126 is on, then manual control over the rear HVAC system via the rear HVAC control panel 142 is enabled (step 306). In this case, the rear microprocessor 140 utilizes the control information transmitted by the front microprocessor 110 in combination with the rear set point temperature, which is the front set point temperature as adjusted by the temperature adjustment dial 152. The rear control panel 142 is back-lit to indicate to the rear passengers that their manipulation of the temperature adjustment dial 152 will have an effect on the rear temperature (i.e., air mix and blower speed of the rear HVAC system (step 308)). Adjusting the temperature adjusting dial 152 incrementally adjusts the rear set point temperature relative to the front set point temperature, as discussed hereinbefore, and thereby affects the air mix or temperature of the air provided to the rear passengers. Accordingly, the rear seat passengers are able to affect the rear temperature (by adjusting the rear set point temperature relative to the front set point temperature), while the rear microprocessor 140 uses the rear set point temperature in combination with the control information provided by the front microprocessor 110 to control the rear HVAC system's mode, air mix, and blower speed by providing appropriate control signals to the mode actuator 144, air mix actuator 146, and power transistor 148 (step 310). Accordingly, the rear HVAC system is operated in an automatic mode while appearing to the rear seat passengers as being manually controlled.

While the rear HVAC system is being controlled as described above, the front HVAC system is being controlled by the front control panel (step 311). The front HVAC system may be either manually controlled or automatically controlled. If the automatic control setting button 122 is not depressed (i.e., in the "manual" or non-automatic position) the front seat passengers may manually control the operation of the front HVAC system to control the mode (vent), air mix (temperature), recirculation/fresh air, compressor activation (A/C), and blower speed (step 314). Alternatively, if the automatic button is depressed (i.e., in the "automatic" position), the mode (vent), air mix (temperature), recirculation/fresh air, compressor activation (A/C), and blower speed are automatically controlled in accordance with the control algorithm stored in the front microprocessor in response to sensed conditions and user input (step 316), as discussed hereinbefore.

With reference to step 304, if the rear manual button 126 is in the off position, manual control over the rear HVAC system via the rear control panel 146 is disabled, the rear control panel 142 is not illuminated, and the rear HVAC system is controlled by the front HVAC control system (step 318). Accordingly, the rear set point temperature in this situation is equal to the front set point temperature, and the rear microprocessor utilizes the control information provided by the front microprocessor 110 to control the mode, air mix, and blower speed of the rear HVAC system.

More specifically, in step 320, the condition of the automatic control setting button 122 is checked. If the setting is automatic, the front and rear HVAC systems are automatically controlled (step 322). The rear microprocessor 140 uses the control information supplied by the front microprocessor 110 to control the mode selection (vent activation), air mix, and blower speed of the rear HVAC system. The front microprocessor control information, which is derived, as noted hereinbefore, from a control algorithm in response to user input and sensed environmental conditions, controls the front HVAC system mode (vent), air mix (temperature), recirculation/fresh air, compressor activation (A/C), and blower settings (step 324).

On the other hand, if in step 320 the control setting is manual, the front and rear HVAC systems are both manually controlled by user input via the front HVAC control system (step 326). User input control settings made via the front control panel 106 are used by the front microprocessor 110 to control the mode, air mix, recirculation/fresh air, compressor activation (A/C), and blower speed of the front HVAC system, and are used by the rear microprocessor 140 to control the mode, air mix, and blower speed of the rear HVAC system (step 328).

While the preferred embodiment of the present invention is shown and described herein, it is to be understood that the same is not so limited but shall cover and include any and all modifications thereof which fall within the purview of the present invention as defined in the claims appended hereto.

What is claimed is:

1. A method for controlling a vehicle heating, ventilation, and air conditioning (HVAC) system, said system including a front HVAC control system for controlling a front HVAC system and a rear HVAC control system for controlling a rear HVAC system, said front HVAC control system including a front control panel to permit passengers to provide control information to said front HVAC control system, said rear HVAC control system including a rear control panel to permit rear passengers to input control information to said rear HVAC control system, said front HVAC control system communicating with said rear HVAC control system and providing control information thereto, comprising the steps of:
    inputting a front set point temperature into said front HVAC control system;
    controlling the front HVAC system in response to the front set point temperature;
    communicating the front set point temperature to the rear HVAC control system;
    inputting a temperature adjustment value into said rear HVAC control system via said rear control panel;
    using the rear HVAC control system to calculate a rear set point temperature to be used by said rear HVAC control system, said rear set point temperature being based upon said front set point temperature and a temperature adjustment value input via said rear control panel;
    controlling the rear HVAC system based upon said control information provided from said front HVAC control system and said rear set point temperature.

2. The method according to claim 1, wherein said rear set point temperature is equal to said front set point temperature plus the temperature adjustment value, said temperature adjustment value being manually input via said rear control panel.

3. The method according to claim 2, wherein the temperature adjustment value is negative such that the rear set point temperature is less than the front set point temperature.

4. The method according to claim 1, comprising the further steps of:
    controlling a blower speed, air mix, and mode of operation of said front HVAC system based upon a first predetermined computer algorithm in response to said front set point temperature and sensed air temperature.

5. The method according to claim 4, comprising the further step of: controlling a blower speed, air mix, and mode of operation of said rear HVAC system based upon a second predetermined computer algorithm in response to said front control information and said rear set point temperature.

6. The method according to claim 4, wherein said rear set point temperature is equal to said front set point temperature plus the temperature adjustment value, said temperature adjustment value being manually input via said rear control panel.

7. The method according to claim 6, wherein the temperature adjustment value is negative such that the rear set point temperature is less than the front set point temperature.

8. The method according to claim 5, wherein said rear set point temperature is equal to said front set point temperature plus the temperature adjustment value, said temperature adjustment value being manually input via said rear control panel.

9. The method according to claim 8, wherein the temperature adjustment value is negative such that the rear set point temperature is less than the front set point temperature.

10. The method according to claim 1, comprising the further steps of:
    controlling a blower speed, air mix, and mode of said front HVAC system based upon a first predetermined control algorithm; and,
    controlling a blower speed, air mix, and blower speed of said rear HVAC system based upon a second predetermined control algorithm.

11. The method according to claim 10, wherein said rear set point temperature is equal to said front set point temperature plus the temperature adjustment value, said temperature adjustment value being manually input via said rear control panel.

12. The method according to claim 11, wherein the temperature adjustment value is negative such that the rear set point temperature is less than the front set point temperature.

13. A vehicle heating, ventilation, and air conditioning (HVAC) control system, said system including a front HVAC control system and a rear HVAC control system, said front HVAC control system including a front control panel to permit front passengers to input control information to said front HVAC control system, said rear HVAC control system including a rear control panel to permit rear passengers to input control information and a temperature adjustment value to said rear HVAC control system, said front HVAC control system communicating with said rear HVAC control system and providing control information thereto, wherein said front HVAC control system communicates a front set point temperature to said rear HVAC control system, and said rear HVAC control system determines a rear set point temperature based upon said front set point temperature and the temperature adjustment value input via said rear control panel.

14. The system according to claim 13, wherein said rear HVAC control panel includes a temperature adjustment device whereby the temperature adjustment value is selected.

15. The system according to claim 14, wherein said temperature adjustment value is selected from a plurality of predetermined temperature adjustment values.

16. The system according to claim 14, wherein said plurality of predetermined temperature adjustment values include negative and positive adjustment values.

* * * * *